2,775,525
Patented Dec. 25, 1956

United States Patent Office

2,775,525

COMPOSITE REFRACTORY MATERIAL

Leslie W. Austin, San Jose, and James C. Hicks, Menlo Park, Calif., assignors to Kaiser Aluminum & Chemical Corporation, Oakland, Calif., a corporation of Delaware No Drawing. Application December 18, 1951,
Serial No. 262,336

17 Claims. (Cl. 106—59)

This invention relates to an improved refractory material which is a composite mineral structure containing agglomerated crystals of periclase and spinels; and it relates more particularly to a refractory material of such composition suitable as grains or aggregates useful in preparing refractory articles.

Synthetic spinels or mixtures of spinels have been made in the past from mixtures of the constituent oxides or materials providing the oxides upon heating by fusing such mixtures. Because of the highly refractory nature of the component oxides it has been necessary to employ substantial amounts of fluxing additives in synthesizing the spinels or to fuse at temperatures of the electric arc furnace. The addition of large amounts of fluxing additives reduces the refractoriness of the product. Refractory shapes prepared by casting the molten oxide or spinel mixtures have been dense and strong in the cold, but have exhibited great sensitivity to rapid changes in temperature or steep thermal gradients within the piece. That is, they have had poor resistance to thermal spalling.

Spinels of the type of chromite, the essential mineral of chromium ore, have long been used in the form of grains as a constituent of refractory articles. Combinations of chromite and periclase grains in various size fractions have been known to provide advantages when used as refractory aggregates. But the natural chromite spinels have the undesirable characteristic of swelling or growing when heated under alternately oxidizing and reducing conditions. This growth is markedly accelerated in the presence of iron oxide. Such growth leads to the disruption of refractory shapes comprising chromite grains, and materially shortens the service life of such shapes, in iron or steel furnaces for example.

The mineral periclase, crystalline magnesium oxide, has been used in more or less impure forms, such as deadburned magnesite for example, as all or part of the aggregate employed in the preparation of refractory shapes. Periclase has very good volume stability in the presence of iron oxide at elevated temperatures, and under certain conditions provides a very satisfactory refractory aggregate. But refractories composed principally of periclase or deadburned magnesite have exhibited poor resistance to thermal shock and insufficient resistance to chemical attack by more acidic slags at high temperatures.

An object of this invention is to provide a composite refractory material exhibiting the best qualities of periclase grains and spinel grains with concomitant reduction or elimination of the less desirable qualities of these components as hitherto known. It is a further object of this invention to provide a process for making a composite refractory material, useful as grain or as bond, having improved qualities, such as better spalling resistance, better bonding properties and increased volume stability under heating.

According to the present invention, there is provided a nonfused refractory material comprising periclase (MgO) crystals and at least two magnesia spinels, the periclase and spinels being present as intergrown crystals, the faces or surfaces of which at least partially, and preferably in major portion, abut upon each other and are bonded directly to each other, that is, to the surfaces or faces of contiguous periclase or spinel crystals. The crystals so provided are at least partially, and preferably substantially, free of films of lower melting matrix material. The film-forming impurities occur in very small amount or in discrete, segregated, or discontinuous zones. These impurities can comprise, for example, silicates, calcium compounds, alkali compounds, boron compounds or mixtures thereof. The crystals of periclase and magnesia spinels are substantially uniformly interdispersed. The refractory material contains from 10% to 75% periclase crystals and from 25% to 90% of crystals of at least two magnesia spinels, including at least 5% of each of at least two magnesia spinels. For example, in one embodiment, the material contains 10% to 75% of periclase and 25% to 90% of magnesia spinels, including at least 5% of magnesioferrite ($MgO \cdot Fe_2O_3$) and at least 5% of magnesiochromite ($MgO \cdot Cr_2O_3$), although other magnesia spinels, e. g. magnesium aluminate ($MgO \cdot Al_2O_3$)

magnesium orthotitanate ($2MgO \cdot TiO_2$), magnesium orthostannate ($2MgO \cdot SnO_2$), can also be present. Other combinations of magnesia spinels and other amounts thereof can be employed in this composition, within the ranges set forth above. In the magnesia spinels, a minor portion of the magnesium oxide can be replaced with, or substituted by, if desired, cobalt oxide, ferrous oxide, manganous oxide, nickel oxide, zinc oxide or other spinel-forming oxide of a bivalent metal. There can be employed, in the amounts shown above, magnesia spinels, for example, of oxides of metals in the trivalent or tetravalent state including aluminum, cobalt, gallium, indium, manganese, titanium, vanadium, or mixtures thereof. The spinels contain MgO as the predominant bivalent metal oxide. The fired composite refractory material or grain contains preferably less than 2.0% CaO. The fired refractory material contains preferably not over 5.0% total impurities, calculated as the respective oxides, which tend to form continuous matrix films, for example, CaO, silica, alkalies, boron.

The product of this invention is an agglomerate of associated or intergrown crystals of periclase and magnesia spinels, in substantially uniform interdispersion, that is, wherein the grain or fragment is a composite structure containing both the periclase and spinel crystals. The spinels constitute a group of double, or multiple oxides of the general formulae $AB_2X_4$ or $A_2CX_4$, or expressed in another manner, $AX \cdot B_2X_3$ or $2AX \cdot CX_2$, where A is a divalent metal, B is a trivalent metal, C is a metal in quadrivalent state and X is oxygen; $B_2X_3$ being a sesquioxide of a spinel-forming metal. These multiple oxides, or spinels, crystallize in the isometric system, and generally display an octahedral or dodecahedral crystal habit.

The magnesia starting material is a magnesium compound which forms periclase upon firing, for example, magnesium hydroxide, natural or artificial magnesite, magnesium carbonate, bicarbonate or basic carbonate, magnesium alcoholate, magnesium chloride or sulfate or other water-soluble magnesium salt, incompletely crystallized magnesium oxide, hardburned magnesia, periclase, etc. The magnesium hydroxide can be prepared, for example, by burning magnesium metal and hydrating the oxide so formed, but more economically, it is obtained by reacting a magnesium salt solution or brine with an alkali such as caustic soda, lime, or calcined dolomite, the latter two either in dry or hydrated slurry form, to precipitate $Mg(OH)_2$ and then washing and preferably separately recovering the latter. The magnesium compound starting material is of such purity that the final product prepared according to the invention preferably contains less than 2.0% CaO; and preferably not over 2.0% $SiO_2$.

The starting materials for the magnesia spinel component can be a spinel or a metal oxide adapted to form a spinel with magnesia. For instance, as an iron-oxide yielding material, or a material yielding iron oxide upon firing, there can be employed iron oxide, mill scale, pyrite sinter, magnetite, hematite, laterite, siderite, limonite. Iron ores so high in sulfur and phosphorus as to be unsuitable for making iron and steel can be employed in the present invention. As a material providing chromium oxide there can be employed chromium oxide, magnesium chromate, ammonium chromate, chromic acid, or more economically, many varieties of chromite ores, including the friable chromites which have hitherto been considered very poor sources of chromite grains themselves. Other chromite ores not suitable for refractory use and not high enough in $Cr_2O_3$ value to be desirable for chemical or metallurgical use, can be employed in the present invention. As materials providing the alumina component of the spinels there can be employed bauxite, diaspore, hydrargillite, laterite, chromite, aluminum hydroxide, alumina or alumina hydrate. Salts of iron, or of chromium, or of aluminum, or mixtures thereof, which are soluble in water or the mixing liquid can be employed. Any desired mixtures of starting materials can be employed, so long as the mix is suitably low in the impurities as described herein.

In addition to the above-mentioned examples of starting materials there are, of course, numerous ores or concentrates thereof which are suitable sources of two or more of the desired components. For example, iron oxide and manganese oxide can be supplied by addition of manganiferous iron ore such as certain magnetite deposits; iron oxide and titanium oxide can be supplied by magnetite-ilmenite ores or by concentrates of certain black beach sands which contain magnetite and ilmenite and which often contain chromite also, thereby providing chrome and alumina as well. Certain laterites or bauxites preferably those low in silica, can be employed as a source of iron oxide as well as alumina. These laterites or bauxites contain from 4% to 96% alumina and up to 86% of iron oxide, on the ignited basis, and some contain small amounts of other compounds useful in this invention such as oxides of Cr, Ni, Co, V, Ti and Mn, and are very low in lime. Breunnerite can be employed to provide magnesia and a portion of the iron oxide.

The amount of calcium expressed as lime, CaO, present in the starting materials or mixture to be fired is preferably limited so that the final fired product will contain not over 2.0% CaO. The calcium forms with silica, iron oxide or alumina lower melting components such as silicates, ferrites, aluminates and aluminoferrites which deleteriously affect the refractoriness of the final product, particularly when substantially uniformly dispersed throughout the structure. Alkali content is preferably not over about 1.0% based on the total weight of fired product and calculated as the oxide, for example, sodium oxide or potassium oxide. Boron content is preferably not over 1.0%, calculated as the oxide, $B_2O_3$. The lime, alkalies and boron tend to attack the spinels to produce lower melting compounds; and also tend to combine with any silica to form lower melting compounds which have a strong tendency to form continuous films on the spinel or periclase crystal surfaces. When the other mentioned impurities are more limited, or lower, in amount, the silica is less harmful because it does not attack the spinels, and, on the other hand, with MgO tends to form highly refractory forsterite.

The starting materials are admixed in very finely divided form, or as intimate interdispersions. This can be accomplished in any desired manner. For example, solutions of the starting materials in a mixing liquid, for instance water, can be mixed together and then dried, or the desired components can be precipitated from the mixed solution. In another mode of procedure, some of the starting materials can be mixed together and then admixed or nodulized with addition of a solution of other starting materials or other forms or compounds of the dry starting materials. The starting materials, where in solid form, should be reduced to finely divided state, preferably to a particle size substantially entirely less than 149 microns in diameter. The starting materials, if desired, can be ground separately and then mixed; or they can be ground together. Improved results are obtained as the materials are more finely divided and preferably the materials are predominantly less than 44 microns in diameter, and with a substantial portion, at least 10%, less than 10 microns in diameter. Excellent results are obtained by starting with precipitated materials such as precipitated magnesium hydroxide or carbonate or basic carbonate. Two or more of the starting materials can be co-precipitated, for example, magnesium hydroxide and iron hydroxide or manganese hydroxide or all three.

The intimately mixed starting materials are then heated to effect combination, crystallization or recrystallization. The mixture can be prepared in the form of a water slurry, introduced into a kiln, such as a rotary kiln, and fired; or dry or dried mixtures can be formed into shapes, if desired, with aid of pressure, such as briquettes, nodules, pellets or the like and fired. The mixtures are preferably fired at a temperature of at least 1600° C., and improved results are obtained by firing at a temperature of at least 1700° C. However, the firing procedure is a function of both time and temperature, and equivalent results can be obtained by firing at a lower temperature for a longer time and at a higher temperature for a shorter time. Alternatively, products of still lower porosity can be obtained by calcining a mixture of starting materials to an intermediate temperature, that is, to a state of incomplete reaction or incomplete crystallization, then pressing the calcined mixture and firing the pressed mass to effect reaction or crystallization. Such intermediate calcining temperatures can be, for example, 800° C. to 1200° C. for not over about an hour; although calcining at a lower temperature for a longer time or at a higher temperature for a shorter time is suitable. This calcining and firing procedure is useful in some instances to produce larger grains or denser pieces. According to this invention the mass is fired without general fusion. The crystals in the present agglomerates are generally smaller than crystals produced by fusion, and this circumstance may be one reason for the improved spalling resistance of the refractories made from these agglomerates.

The mode of carrying out the process of the invention, and the products produced, will be more clearly explained by the example set forth below.

*Example 1*

28% by weight of a chromite ore, showing upon analysis, 5.6% $SiO_2$, 15% $Fe_2O_3$, 31% $Cr_2O_3$, 27% $Al_2O_3$, 1.1% CaO and 20.3% MgO, is ground to pass a 200 mesh screen (74 microns opening) and is intimately admixed with 72% by weight, calculated as MgO, of precipitated magnesium hydroxide filter cake, showing upon analysis, on the ignited basis, 1.5% $SiO_2$, 1.3% CaO and 1.2% sesquioxides ($Fe_2O_3$ and $Al_2O_3$). A portion, I, of the batch is fired at 1700° C. for one-half hour; and another portion, II, is fired at 1100° C. for one-half hour, pressed into briquettes and the latter fired at 1700° C. for one-half hour. The porosity of I is 9.4%. The porosity of II is 4.3%. The final fired refractory mineral or grains are calculated to be of the following mineral composition: 68.8% periclase (MgO), 5.4% magnesioferrite ($MgO \cdot Fe_2O_3$), 9.9% magnesium aluminate ($MgO \cdot Al_2O_3$), 98% magnesiochromite ($MgO \cdot Cr_2O_3$), 3.5% monticellite ($CaO \cdot MgO \cdot SiO_2$) and 2.8% forsterite ($2MgO \cdot SiO_2$); and the crystal surfaces in the structure are predominantly free of continuous matrix films. Grains of the composition of this example, when made up into shaped masses, and heated under a loading of 25 pounds per square inch, failed by shear at 1805° C. Several samples of these shapes, when fired to 600° C., 800° C. and 1000° C., respectively, exhibited cold crushing strengths thereafter of, respectively, 4300 pounds per square inch, 3600 pounds per square inch and 6900 pounds per square inch. Ordinary periclase made into shaped masses in the same manner shows a minimum cold crushing strength of 1500 pounds per square inch after firing at about 800° C.

*Example 2*

23.1%, calculated as $Al_2O_3$, of aluminum hydroxide ($Al(OH)_3$), 38.7%, calculated as $Fe_2O_3$, of pyrite sinter, and 38.3%, calculated as MgO, of hardburned magnesia, are ground to pass 200 mesh and are intimately mixed together, then pressed into small bricks, and fired for one-half hour at 1700° C. The aluminum hydroxide contains about 98.8% $Al_2O_3$ on the ignited basis. The pyrite sinter, obtained by burning pyrite shows upon analysis 4.17% $SiO_2$, 90.4% $Fe_2O_3$, 5.4% $Al_2O_3$, and traces of CaO and Cu. The hardburned magnesia shows upon analysis 1.5% $SiO_2$, 0.74% $Fe_2O_3$, 0.46% $Al_2O_3$, 1.3% CaO and 96% MgO. The fired material exhibits a porosity of 6.6%; and a calculated mineralogical composition of 15.7% periclase (MgO), 44.3% magnesioferrite ($MgO \cdot Fe_2O_3$), 34.2% magnesium aluminate ($MgO \cdot Al_2O_3$), 1.4% monticellite ($CaO \cdot MgO \cdot SiO_2$) and 3.9% forsterite ($2MgO \cdot SiO_2$). In the structure produced the impurities occur in discrete, discontinuous zones. The product does not swell or crack when heated in contact with iron oxide at 1650° C. for two hours, and, in fact, exhibits slight shrinkage in this test. The grains are made up in shaped pieces and heated under a load of 25 pounds per square inch, failing by shear at 1725° C. The shaped pieces exhibit good resistance to thermal spalling as compared with chrome-magnesite refractory of typical commercial composition made from the materials of the prior art.

With proper choice of naturally occurring starting materials the low limits of impurities preferred in the product of this invention can be attained quite economically. For example, as magnesia source a high purity magnesite occurring in Brazil (Belo Horizonte) is employed. On the ignited basis this material analyzes as follows: MgO 93.5%, $Fe_2O_3$ 5.2%, $Al_2O_3$ 0.1%, CaO 0.5%, $SiO_2$ 0.7%. A ferruginous laterite from Cuba (Oriente Province) has the following analysis: $SiO_2$ 2.7%, $Fe_2O_3$ 72.4%, $Al_2O_3$ 23.4%, $Cr_2O_3$+NiO+CoO 1.5% on the ignited basis. (Ignition loss is 10.6%.) With these materials is blended a friable African (Transvaal) chromite of the following typical analysis: $SiO_2$ 2.2%, $Cr_2O_3$ 44.4%, $A_2O_3$ 16.8%, CaO 0.2%, MgO 11.3%, iron as $Fe_2O_3$ 28.0%.

The magnesite is first lightly calcined to drive off carbon dioxide and is then pulverized so that substantially all of it is finer than 200 mesh (74 microns). The other materials are likewise finely milled so that at least a major portion is finer than 200 mesh. Then two parts of the magnesia and one part each of the laterite and chromite are intimately blended. They can be blended and fired directly, or blended and nodulized while spraying with a ferrous sulfate solution or other binder prior to firing. In an alternative method the dry mixture is tempered with about 15% of a dilute aqueous chromic acid or magnesium chromate solution and then formed into shapes in briquetting rolls. The mixtures or briquettes are then fired in a rotary kiln at 1700° C. to 1750° C. to form the refractory product. The calculated mineralogical composition of the product is then: periclase 35.3%, magnesioferrite 32.9%, magnesiochromite 14.7%, magnesium aluminate 13.5%, forsterite 2.8%, and monticellite 0.8%.

Instead of the starting materials shown in the above examples, other mixtures can be employed, provided the impurities are low or in such state that continuous films are not formed upon firing. Mixtures of finely divided periclase and magnesia spinels can be heated to form the structure of the present invention, recrystallization being effected upon firing. Porosity is measured by determining the bulk density of grains of the size fraction between 6 mesh (3.36 mm. opening) and 10 mesh (2.00 mm. opening), and the true specific gravity of the same material, both expressed as grams per cc., the difference between the specific gravity and the bulk density being divided by the specific gravity and then multiplied by 100.

The refractory material made according to this invention can be employed as grains in preparing refractory articles, either alone or in admixture with other nonacid grains, and in suitable grain sizing ratios as known to the art. Various bonding materials known to the art, such as magnesium chloride, magnesium sulfate or magnesium chromate, for example, can be employed with these grains in preparing refractory articles. The product made according to this invention can also be employed as bonding material, for example, in finely divided form, in refractory articles comprising like grains or other nonacid grains or mixtures of such grains.

The product of this invention is particularly advantageous in that there is provided a structure which is an agglomerate of crystals the surfaces of which are at least partially, preferably substantially, free of films of matrix material. The products prepared according to the invention are substantially free from glasses. It is believed that the improved performance of the product of this invention is due to the direct bonding of periclase-to-spinel, periclase-to-periclase and spinel-to-spinel crystals which is enabled by the partial or substantial elimination of the intercrystalline films of materials which are less refractory than periclase and magnesia spinel. Even with thin films of lower melting matrix, the properties of the refractory are limited by that matrix rather than by the spinels or periclase, but where the matrix films become discontinuous, the above-mentioned crystal-to-crystal bonding becomes effective in determining the properties of the refractory. The structure, containing 10% to 75% periclase and 25% to 90% magnesia spinel crystals, exhibits improved characteristics with regard to the action of bonding materials employed to bond the grains into refractory articles, because in such composition, the grain surfaces will contain some periclase crystals and some spinel crystals, and there can be employed a bond compatible with one or another of the spinels or with the periclase. The crystals as disclosed herein, at least partially film-free, and grains containing them, are very well adapted to bonding by synthetic spinel minerals. It has also been found that grains made according to the present invention are excellently bonded by the forsterite bonding materials disclosed and claimed in Austin, U. S. 2,434,451; and the composite magnesioferrite and forsterite bonding materials shown in Austin 2,433,415 are also useful with the present grains.

The properties of the final refractory grain or bond material made according to the present invention can be tailored by varying the ratios of the periclase crystals to spinel crystals and also by varying the composition of the magnesia spinels. For instance, the provision of at least 5%, based on the total weight of the grain, of magnesium aluminate ($MgO \cdot Al_2O_3$), improves stability toward iron oxide swelling and toward reducing conditions. The presence of at least 5% of magnesioferrite provides higher density of the grain and high refractoriness, and also favorably affects resistance to iron oxide swelling. Presence of magnesiochromite in the grain provides increased resistance to chemical attack. It is especially advantageous in some instances, where chromite is employed as the spinel-forming starting material, to admix also, as substitute for a portion of the chromite, from 5% to 50% thereof of an iron oxide-yielding material, calculated as Fe2O3, to promote reaction and crystallization. Mutual solid solutions of the periclase and the spinels can be present in the product of this invention. It is an advantage of the mixed crystal structure as disclosed herein that varying characteristics can be obtained in the fired grain, depending upon the starting components and proportions thereof. It is also advantageous that the synthetic composite grains of this invention are not appreciably wetted by iron oxide, and there is apparently no substantial penetration of the latter into the grains or into refractory articles such as bricks, furnace bottoms, etc., made from these grains.

The products of the invention are formed by solid state reactions or recrystallizations which may be aided by strains or imperfections in the crystal lattices of the starting materials brought about by fine grinding. The resulting mineral structure is one of relatively small substantially uniformly dispersed crystals of periclase and magnesia spinels whose crystal surfaces are at least partially and often predominantly free from films of lower-melting matrix materials. It is believed that the improved properties of these products as compared to chemically similar compositions prepared by fusion, e. g. increased resistance to thermal spalling, are due to the direct crystal-to-crystal bonding provided by the structure of the invention with dispersal of the small amounts of impurities into discontinuous zones. In contrast, in the fused materials where the crystals are relatively large the same amounts of impurities give rise to continuous and relatively thick films of matrix separating the refractory crystals. In the latter structure the properties of the refractory are limited by the characteristics of the impurity phase.

In conformity with common practice in reporting chemical analyses of refractory materials, in the specification and claims the proportions of the various chemical constituents present in the material are given in some instances as though these constituents were present as the simple oxide. Thus, the lime is reported as CaO; silicon, as silica, $SiO_2$; magnesium as magnesium oxide, MgO, although the silica and lime may be present in combination with each other or with a small amount of MgO. For example, the term "2.0% CaO" is intended to mean that a chemical analysis of the material referred to would show the Ca content as 2.0%, expressed as CaO, although all of the calcium might be present as calcium silicate or in some other combined form. The spinel analyses are expressed or calculated, as shown in the examples above, as simple double oxides, although the oxides may also be present as complex spinels or as solid solutions. Thus, the magnesium chromite is expressed as

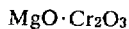

$$MgO \cdot Cr_2O_3$$

although a minor amount of MgO can be replaced by another bivalent metal oxide, such as FeO, and a minor amount of the $Cr_2O_3$ can be replaced by another oxide of a spinel-forming metal having a valence greater than two, as described above. The product consists essentially of intergrown crystals of periclase and at least two magnesia spinels, in the ratios described. The term "periclase" as used herein indicates magnesium oxide, MgO, crystals. The term "chromite" designates chromium ore. In the specification and claims, percentages are expressed by weight except as to porosity or where otherwise indicated. The mesh sizes given herein are according to United States Standard series.

Having now described the invention, what is claimed is:
We claim:

1. Nonfused crystalline refractory structure consisting essentially of agglomerated intergrown crystals of periclase and at least two magnesia spinels, in amounts calculated as from 10% to 75% periclase and from 25% to 90% of said magnesia spinels, and containing less than 2.0% CaO and not over 5.0% total impurities, the surfaces of said periclase and said spinel crystals at least partially abutting upon and bonding directly to surfaces of contiguous periclase and spinel crystals.

2. Nonfused crystalline refractory structure consisting essentially of agglomerated intergrown crystals of periclase and at least two magnesia spinels, in amounts calculated as from 10% to 75% periclase and from 25% to 90% of said magnesia spinels, and containing less than 2.0% CaO and not over 5% total impurities, a major portion of the surfaces of said periclase and spinel crystals abutting upon and bonding directly to the surfaces of contiguous periclase and spinel crystals.

3. Nonfused crystalline refractory material consisting essentially of agglomerated intergrown crystals of periclase and at least two magnesia spinels, in amounts calculated as from 10% to 75% periclase and from 25% to 90% of said spinels, and containing less than 2.0% CaO and not over 5% impurities, the surfaces of said crystals being at least partially free of a film of matrix materials.

4. Product as in claim 3 wherein said crystal surfaces are substantially free of a film of matrix material.

5. Product as in claim 3 containing not over 2.0% silica.

6. Product as in claim 3 containing not over 1.0% alkali.

7. Product as in claim 3 containing not over 1.0% boron oxide.

8. Nonfused crystalline refractory material consisting essentially of agglomerated intergrown crystals of periclase and at least two magnesia spinels, in amounts calculated as from 10% to 75% periclase and from 25% to 90% of said magnesia spinels including at least 5% of each of two magnesia spinels, said refractory material containing less than 2.0% CaO and not over 5% total impurities, the surfaces of said periclase and spinel crystals being at least partially free of a film of matrix material.

9. Product as in claim 8 containing not over 2.0% of silica.

10. Product as in claim 8 containing at least 5% of magnesioferrite.

11. Product as in claim 8 containing at least 5% of magnesiochromite.

12. Product as in claim 8 containing at least 5% of magnesium aluminate.

13. Nonfused crystalline refractory material consisting essentially of agglomerated intergrown crystals of periclase and at least two magnesia spinels, in amounts calculated as from 10% to 75% periclase and from 25% to 90% of said magnesia spinels, and containing less than 2.0% CaO and not over 5% total impurities, the impurities in said material being dispersed therethrough in discrete, discontinuous zones.

14. Product as in claim 13 wherein a minor amount of the magnesia in said magnesia spinels is replaced by at least one other spinel-forming oxide of a bivalent metal.

15. Nonfused crystalline refractory structure consisting essentially of agglomerated intergrown crystals of periclase and at least two magnesia spinels, in amounts calculated as from 10% to 75% periclase and from 25% to 90% of said spinels, and containing less than 2.0% CaO, not over 2.0% $SiO_2$, not over 1.0% alkali, not over 1.0% boron oxide and not over 5.0% total impurities, the surfaces of said crystals being at least partially free of a film of matrix material.

16. Process for making nonfused crystalline refractory material consisting essentially of crystals of periclase and at least two magnesia spinels which comprises intimately admixing at least 5%, calculated as magnesia spinel, of a material which upon firing provides a metal oxide adapted to form spinel with magnesia when fired therewith, and at least 5%, calculated as magnesia spinel, of a material which provides upon firing a second metal oxide adapted to form spinel with magnesia when fired therewith, and an amount of periclase-yielding material to react completely with said metal oxide-providing materials to form spinels and to provide from 10% to 75% excess periclase, and firing said admixture at a temperature of at least 1600° C. but without fusion for at least one-half hour to form a product comprising intergrown periclase crystals and magnesia spinel crystals wherein the surfaces of said crystals are at least partially free of matrix films, said periclase-yielding material and said metal oxide-yielding materials containing on the fired basis less than 2.0% CaO and not over 5% total impurities, and being of particle size substantially entirely less than 149 microns, predominantly less than 44 microns and at least 10% less than 10 microns.

17. Process as in claim 16 wherein said periclase-yielding material and said metal oxide-yielding materials contain on the fired basis not over 2.0% $SiO_2$.

References Cited in the file of this patent

UNITED STATES PATENTS

| | | |
|---|---|---|
| 883,286 | Buchner | Mar. 31, 1908 |
| 2,079,066 | Hartmann | May 4, 1937 |
| 2,311,970 | Seil | Feb. 23, 1943 |
| 2,671,732 | Birch et al. | Mar. 9, 1954 |

FOREIGN PATENTS

| | | |
|---|---|---|
| 11,175 | Great Britain | 1907 |
| 468,456 | Great Britain | 1937 |

UNITED STATES PATENT OFFICE
CERTIFICATE OF CORRECTION

Patent No. 2,775,525                                                December 25, 1956

Leslie W. Austin et al.

It is hereby certified that error appears in the printed specification of the above numbered patent requiring correction and that the said Letters Patent should read as corrected below.

Column 4, line 73, for "68.8% periclase" read -- 68.6% periclase --; line 75, for "98%" read -- 9.8% --; column 5, line 57, for "$A_2O_3$" read -- $Al_2O_3$ --.

Signed and sealed this 5th day of January 1960.

(SEAL)
Attest:

KARL H. AXLINE
Attesting Officer

ROBERT C. WATSON
                                                           Commissioner of Patents